March 2, 1971    K. SCHNEIDER ET AL    3,567,340
VARIABLE PITCH PROPELLER

Filed May 21, 1968    3 Sheets-Sheet 1

INVENTORS
GEORGE M. WATSON
KURT SCHNEIDER
BY

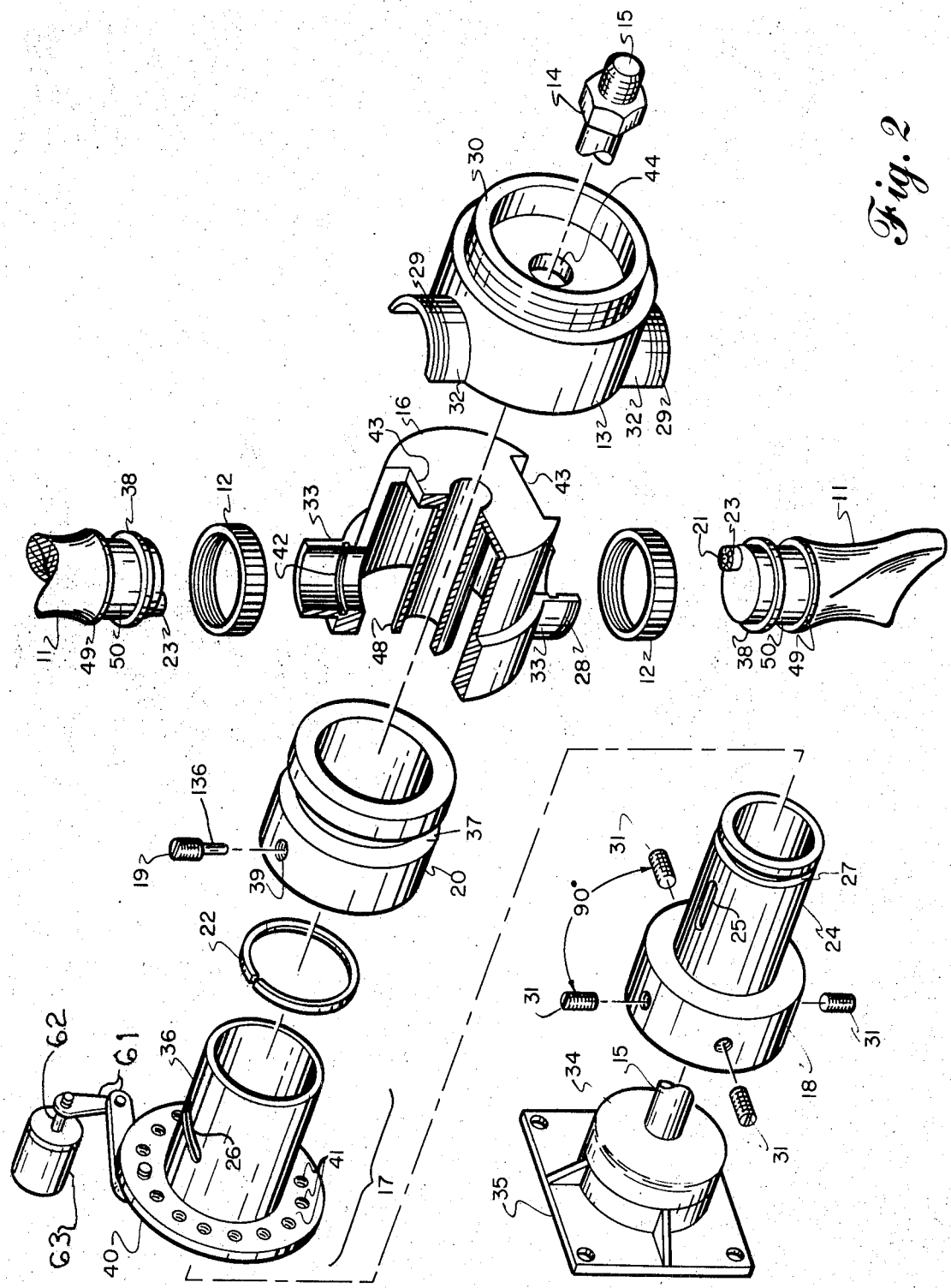

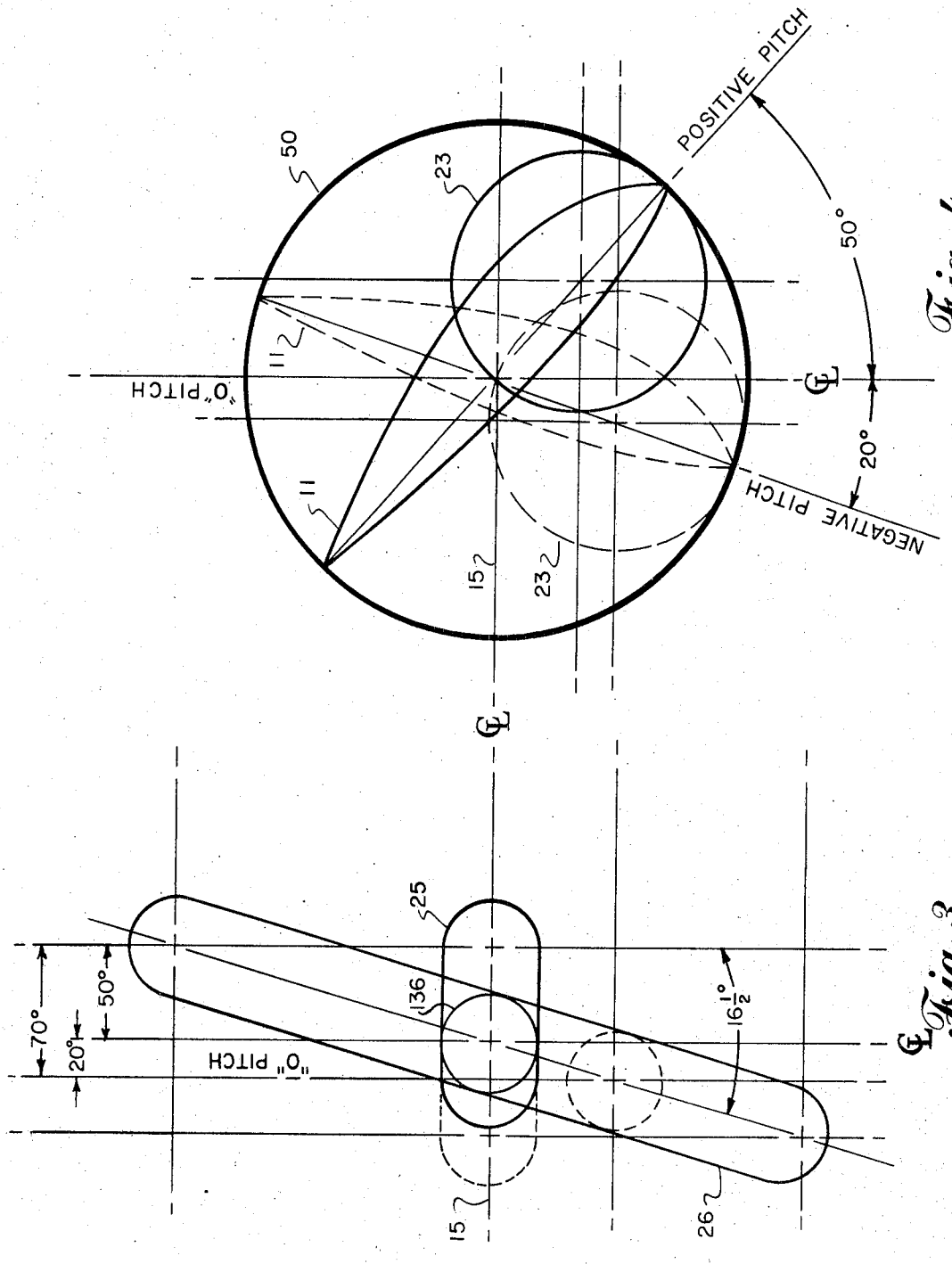

United States Patent Office 3,567,340
Patented Mar. 2, 1971

3,567,340
VARIABLE PITCH PROPELLER
Kurt Schneider, Maspeth, and George M. Watson, New York, N.Y., assignors to Kurt Schneider, Maspeth, and George M. Watson, New York, N.Y., fractional part interest to each
Filed May 21, 1968, Ser. No. 730,878
Int. Cl. B63h 3/04
U.S. Cl. 416—162                          6 Claims

ABSTRACT OF THE DISCLOSURE

A variable pitch propeller mechanism which fits over the drive shaft of a conventional single ended power plant and permits blade adjustment adjacent to the output shaft. One end of each propeller blade contains a bearing which is offset from its axis of pitch rotation and which is coupled into an annular slot in an axially sliding bearing ring. The bearing ring contains a cam follower which tracks in both an axial slot and a spiral slot so that rotation of the spiral slot will axially displace the bearing ring so as to move the offset bearings and rotate the propeller blades.

---

This invention relates to a variable pitch propeller used for propelling a vehicle through fluid medium.

More specifically, this invention relates to a novel variable pitch propeller wherein the pitch of the blades may be adjusted while the propeller is in rotation at a location adjacent to or remote from the propeller either manually or automatically.

Conventional variable pitch propellers generally consist of complex mechanisms for changing the pitch of the propeller blades and are controlled through the shaft of the power plant from a remote location. The engine is specifically designed to accommodate the variable pitch propeller on the ends of its drive shaft in order to accommodate the controls necessary for changing the pitch of the blades. There are, however, many conventional power plants, particularly in the model aircraft and boat field, which are not set up, or cannot be easily designed, to receive the available variable propeller mechanisms. Many of these engines have only a single ended drive shaft which is solid in construction, and therefore do not adapt themselves to permit blade adjustment.

Accordingly, the present invention relates to a variable pitch mechanism which fits over the drive shaft of conventional single ended power plants and permits blade adjustment in one embodiment at a location adjacent to the output shaft. In the invention, one end of each propeller blade contains an eccentric bearing which is offset from its axis of rotation and is inserted into an annular groove on a bearing ring surrounding the drive shaft of the motor. The bearing may be urged along the axis to change the pitch of the propeller blades by means of a sleeve containing a spiral groove coupled to a cam follower secured in the bearing ring. The sleeve containing the spiral groove is mounted on a stationary housing and may be rotationally adjusted from a position immediately behind the propeller mechnaism. The apparatus according to the invention finds particular use in scale model vehicles such as airplanes and boats which employ glow-plug internal combustion engines. Glow-plug engines have the disadvantage of not being able to idle smoothly at slow speeds due to the cooling of the glow-plug. Moreover, slow speed running of these engines often causes excessive vibration to be transmitted throughout the body of the vehicle. The apparatus of the present invention permits the pitch of the propeller connected to the output shaft of the glow-plug engine to be "feathered" in order to permit the engine to idle at a much higher speed than normally is permissible without causing the vehicle to be in motion.

It is, therefore, an object according to the present invention, to provide a variable pitch propeller apparatus which may be readily adapted to single ended engines.

It is another object according to the present invention to provide a variable pitch propeller mechanism which may be controlled while being driven, at a point adjacent to the mechanism.

It is still a further object according to the present invention to provide a variable pitch propeller apparatus which is simple in design, easy to manufacture, and inexpensive in costs.

Other objects and features of the present invention will become apparent from the following detailed description considered in connection with the accompanying drawings which disclose an embodiment of the present invention. It should be understood, however, that the drawings are designed for the purposes of illustration only, and not as a definition of the limits of the invention as to which reference should be made to the appended claims.

In the drawings wherein similar reference characters denote similar elements throughout the several views:

FIG. 2 is an exploded view of the elements of the apparatus of FIG. 1;

FIG. 3 is a detailed drawing of the cam follower travel of the invention; and

FIG. 4 is a pitch diagram of the propeller blades of the invention.

Figure 1:
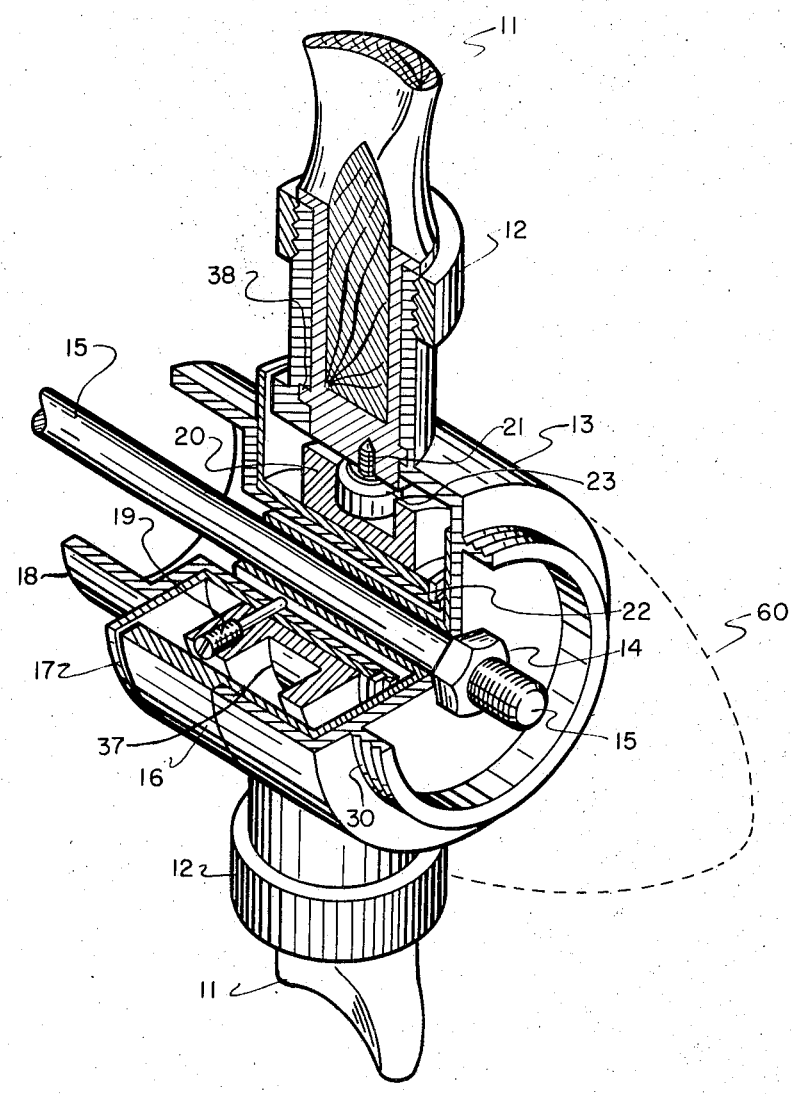
FIG. 1 is an isometric view, partly in cross-section of the apparatus according to the invention.

Referring to the figures, there is shown the apparatus according to the invention supported in part on a mounting housing 18 which is coupled to a hub 34 of a conventional power source 35 by means of four oppositely directed grab screws 31. Housing 18 includes a hollow cylindrical sleeve member 24 coaxially aligned with the axis of drive shaft 15 of motor 35. The end of sleeve 24 includes an annular slot 27 which is adapted to receive retaining ring 22 after sleeve 24 is slideable inserted into sleeve 36 of cam control band 17. Sleeve 36 has an internal diameter slightly larger than the external diameter of sleeve 24 in order to allow sleeve 24 to rotate freely therein. Sleeve 36 also includes a spiral slot 26 which is cut through the surface of the sleeve and which extends partially around the circumference of the sleeve. Spiral slot 26 is adapted to overlap a longitudinal slot 25 formed in the surface of sleeve 24, parallel to the axis of shaft 15. The assembly of cam control band 17 and mounting housing 18 are slideably inserted in a bearing ring 20. After slots 25 and 26 are aligned under a threaded hole through the surface of bearing ring 20, a cam follower pin 19 is threadably engaged into hole 39 so that its projecting portion 136 passes through both slots 25 and 26. Therefore, by maintaining mounting housing 18 stationary and rotating flange 40 of the cam control band 17, the projection 136 of cam follower 19 will track in both slots 25 and 26 and cause bearing ring 20 to slide axially along the surface of sleeve 36.

Adjacent to one end of bearing ring 20 is cut an annular slot 37 having a width and depth sufficient to accommodate one or more offset bearings 23 connected to each end of propeller blade 11. Propeller blade 11 is secured at its base into a boss member 50 which is cylindrically shaped, and includes an upper flange 49 at its point of contact with the end of the blade, and a second flange 38 disposed on its circumference adjacent to its free end. Offset bearings 23 are secured to the ends of propeller bosses 50 by means of fasteners 21 threadably inserted into its body. Bearings 23 may consist of small ball bearing assemblies whose outer surface will rotate freely around fasteners 21.

The apparatus according to the invention also includes a rear housing 16 which contains integrally formed on its circumference, sockets 33 which project in opposite directions perpendicular to the axis of rotation. Sockets 33 consists on one-half of a cylindrical sleeve having a helical threads adjacent to its opening and include annular slots 42 disposed within the internal circumference of the sockets adjacent to the body of housing 16. Housing 16 consists of a partial cylindrical shell which has one end open to receive bearing ring 20 and includes apertures which are communicative between slot 37 and socket 33. Housing 16 also includes channel openings 43 which are directed parallel to the axis of rotation terminating in the aperture at the base of socket 33.

Propeller blades 11 are then inserted sideways into the open sides of sockets 33 so that bearing 23 will pass through channel 43 and engage annular slot 37 in bearing ring 20. Moreover, sleeve 38 will pivotably seat propeller blade 11 in slot 42 of socket 33.

Blade boss nut 12 has an internal diameter sufficient to pass freely over the flanges of boss 50 so that nut 12 may be slipped over and momentarily held adjacent to the shank of the propeller blade while the blade assembly is inserted into the sockets of the rear housing. After propeller blades 11 are seated in place in rear housing 16, a forward housing 13 consisting of a cylindrical shell slightly larger than the adjoining end of rear housing 16, is inserted thereover so that its corresponding sockets 32 engage sockets 33. The cylindrical hole formed by sockets 32 and 33 after housing 16 and 13 are brought together, is slightly larger than the cylindrical diameter of boss member 50 so as to permit blades 11 to be pivotably coupled within the sockets. Helical threads 29 found at the end of socket 32 are a continuation of helical threads 28, so as to permit boss nut 12 having a corresponding internal thread to be lowered and threadably engaged to sockets 32 and 33. Boss nuts 12 secure rear housing 16 to forward housing 13 so that blades 11 will be pivotably retained in sockets 32 and 33.

Blades 11 are secured in boxes 50 so that the ends of the blades of each propeller will be in corresponding pitch alignment.

The front face of forward housing 13 includes a center hole 44 for receiving the end of shaft 15. The end of shaft 15 includes a helical thread so that after the variable pitch assembly is mounted on shaft 15, a fastening nut 14 can be threadably engaged to the end of shaft 15 and tightened against the forward face of housing 13. The front face of housing 13 also includes a threaded flange 30 adapted to receive a cone 60 for streamlining the engine and concealing shaft 15.

In final assembly, bearing ring 20 and cam control band 17 are supported on stationary housing 18 which is mounted to the engine block while the forward and rear housing which contain the propeller blades assemblies are supported on shaft 15 passing through channel 48 of housing 16 and will rotate with engine shaft 15 freely over the stationary components.

To change the pitch of blades 11 it is only necessary to rotate flange 40 of cam control band 17 in remote control vehicles. This may be accomplished by connecting linkages 61 from the shaft 62 of servo motor 63 to an aperture 41 on the surface of flange 40. By rotating flange 40, spiral slot 26 engaged to cam follower 19, will urge bearing ring to displace forward or backward along the axis of shaft 15. The movement of bearing ring 20 and its corresponding slot 37 will cause offset bearings 23, disposed in slot 37, to urge blades 11 in rotation. Blades 11 need only be pivoted approximately one-quarter turn in order to go from the position of full pitch engagement to zero or neutral pitch.

Bearings 23 are arranged in slot 37 so that the full range of pitch of blades 11 may be accomplished without bearing 23 having to pass through dead center, a position which occurs if bearings 23 were to come into alignment with the axis of shaft 15.

FIG. 3 is a plan view in detail of the travel of the end pan 136 of cam follower 19 in slots 25 and 16. In an actual embodiment of the apparatus according to the invention, slot 26 was offset 16½ degrees of arc from a line perpendicular to the axis 15' of shaft 15. Slot 25 extends parallel along axis 15' and thus limits the axial travel of cam follower pin 136. For a particular model aircraft design, it was desirable to control the pitch of blade 11 through 70 degrees of travel. Thus when pin 36 travels to the forward end of slot 25, the pitch of blades 11 will be 50 degrees in the positive direction. Likewise when pin 136 moves to the rear position of slot 25, the pitch will be 20 degrees in the negative direction. By extending slot 25 an additional length as shown in dotted lines, it is possible to increase the negative pitch to equal or exceed the positive pitch angle.

FIG. 4 is a cross-sectional view illustrating in dark lines the positive pitch position of propeller blade 11, and the negative pitch position in dotted lines. FIG. 4 also denotes the position of offset bearing 23 for both pitch position with respect to axis 15' and boss member 50. In this embodiment, the 0 pitch position representing the position of blade 11 when "feathered" is located along the line perpendicular to axis 15'. If the positive or negative pitch angle were increased to 90 degrees so that the axis of offset bearing 23 crosses axis 15' blade 11 would lock into its dead center position and further pitch adjustments would be impossible. The length of slot 25 has therefore been designed to prevent pin follower 136 from exceeding pitch angles which approach dead center.

Field tests performed on an actual embodiment of the invention have proven that due to the large mechanical advantage between the rotation of control flange 40 and the rotation of blade 11 that smooth adjustment of the blade pitch is possible even under full speed operation. Moreover there is no tendency of the fluid forces against the blade to change the adjustment of the pitch even when flange 40 is not held fixed in place.

It is obvious from the detailed description of the invention that the apparatus according to the invention may also be applied to propelling other vehicles such as boats. The invention finds particular application when used with glow-plug engines for propelling boats and airplanes since it permits the engine to be feathered and therefore operated at a much higher speed than is normally permissible without causing the glow-plug to cool and interrupt engine operation.

In model aircraft applications propeller blades often break during takeoffs and landings and must be easily replaced for continued use of the model. Blades 11 can be easily removed from their sockets by removing boss nuts 12 from the sockets and retaining nut 14 from shaft 15 so as to free the forward housing from the rear housing.

The variable pitch mechanism according to the invention also finds particular usefulness with electric fans. Conventional electric fans generally utilize two speed motors which allow for only two variations in wind velocity. The variable pitch mechanism of the present invention, however, permits not only a full range of wind velocity, but also permits the fan to be used for both intake and exhaust purposes since the pitch angle can be adjusted in both negative and positive positions. With a variable pitch fan utilizing a single speed motor running in one direction only, a full range of wind velocities for both intake and exhaust purposes can be realized.

The components of the variable pitch mechanism according to the invention may be constructed from die cast aluminum or other metal parts, or molded from plastics such as nylon, and produced in large quantities at low cost.

The variable pitch propeller apparatus can also be utilized on boats and other pleasure craft powered by inboard and outboard motors. When the variable pitch apparatus is applied to a boat engine, it is possible to eliminate the forward, neutral and reverse shift mechanism since the pitch of the propeller blades can be adjusted to either a neutral, forward or reverse pitch position to control the speed and direction of travel of the boat. In conventional boats, the pitch of the propeller blades is fixed for an average operating condition. However, when the load capacity of the boat is increased above average conditions, or the boat is used for towing another water craft or skier, it becomes desirable to reduce the pitch of the propeller blades in order to permit the engine to reach its full operating speed to deliver its maximum power output. Thus when the variable pitch apparatus of the invention is applied to pleasure craft, the pitch of the propeller blade may be readily adjusted to adapt for any operating conditions to which the boat is subjected.

While only a single embodiment of the present invention has been shown and described, it will be understood that many changes and modifications may be made thereunto without departing from the spirit and scope of the invention.

What is claimed is:

1. A variable pitch propeller apparatus for mounting on the output shaft of a power source comprising:
   propeller blades having pivotal pitch turning axes,
   a blade housing supported on the output shaft and including sockets for pivotably receiving and supporting said propeller blades,
   a bearing secured to the supported end of each of said propeller blades and offset from the pivotal pitch turning axes thereof,
   a first sleeve surrounding the output shaft and disposed in said housing and including a spiral camming groove disposed partially around its circumference,
   a second sleeve coaxially and slidably inserted over said first sleeve and including an annular slot engaged with said offset bearings,
   cam follower means secured within said second sleeve in sliding engagement with said spiral groove of said first sleeve, and,
   a third sleeve coaxially disposed within said first sleeve and including a longitudinal slot on its surface engaging said cam follower means, said third sleeve being mounted to the power source so that rotation of the spiral camming groove of said first sleeve against said cam follower means axially displaces said second sleeve and its annular slot along the path of the longitudinal slot of said third sleeve to pivot said propeller blades on their pitch turning axes.

2. The apparatus as recited in claim 1 wherein said first sleeve additionally comprises a flange secured to one end thereof for imparting rotation thereto to urge said third sleeve in axial movement to pivot said propeller blades.

3. The apparatus as recited in claim 2 wherein said offset bearing is a ball bearing assembly pivotably secured at the end of said blades.

4. The apparatus as recited in claim 3 wherein said propeller blades additionally comprise a boss member secured to the end of each of said blades and including at least one annular flange for engagement with a corresponding annular slot in the socket of said propeller housing.

5. The apparatus as recited in claim 4 wherein the length of said axial slot on said third sleeve limits the travel of said second sleeve member so as to limit the forward and reverse pitch of said propeller blades.

6. The apparatus as recited in claim 5 additionally comprising motor control means coupled to said flange on said first sleeve member for permitting pitch adjustment from a remote location by rotation of said flange.

References Cited
UNITED STATES PATENTS

| | | | |
|---|---|---|---|
| 1,650,776 | 1/1927 | Stock | 170—160.48X |
| 1,891,384 | 12/1932 | Gillis et al. | 170—160.47 |
| 2,625,999 | 1/1953 | Voyce | 170—160.47 |
| 2,850,106 | 9/1958 | Swan | 170—160.42 |
| 3,169,582 | 2/1965 | Schilder et al. | 170—160.44X |
| 3,231,313 | 1/1966 | Fermer | 170—160.43X |
| 1,456,699 | 5/1923 | Kramer | 170—160.44 |
| 2,146,367 | 2/1939 | Berliner | 170—160.53 |
| 2,711,796 | 6/1955 | Amiot | 170—160.39X |

EVERETTE A. POWELL, JR., Primary Examiner

U.S. Cl. X.R.

416—167